March 8, 1932.  H. A. SPERLICH ET AL  1,848,499
CABINET IRONING MACHINE
Original Filed July 30, 1925   12 Sheets-Sheet 1
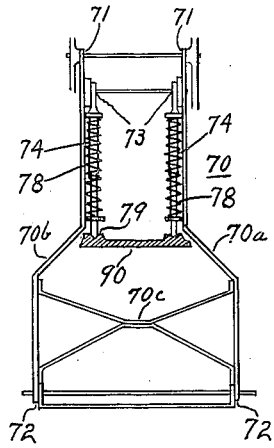
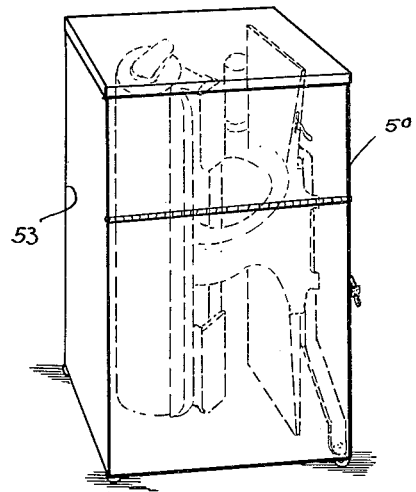
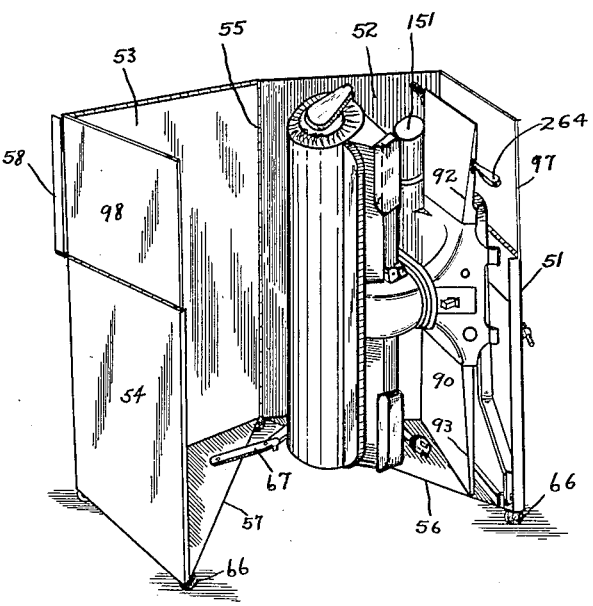
INVENTORS.
Herman A. Sperlich and
Johannes H. Uhlig,
BY
Francis D. Hardesty
their ATTORNEY March 8, 1932.  H. A. SPERLICH ET AL  1,848,499
CABINET IRONING MACHINE
Original Filed July 30, 1925   12 Sheets-Sheet 2
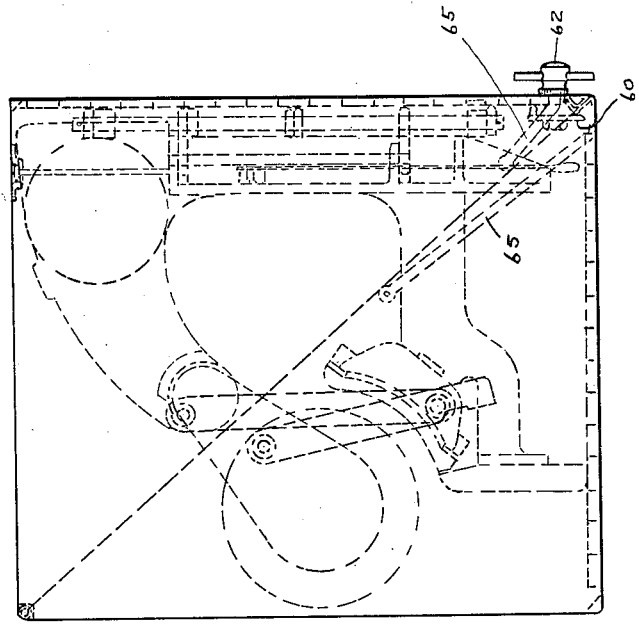
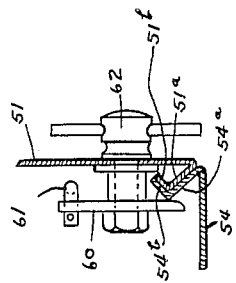
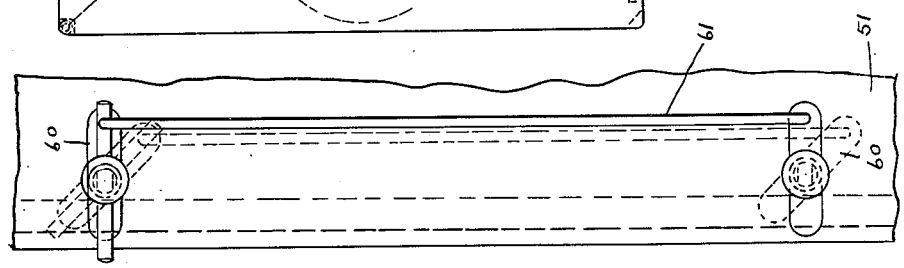
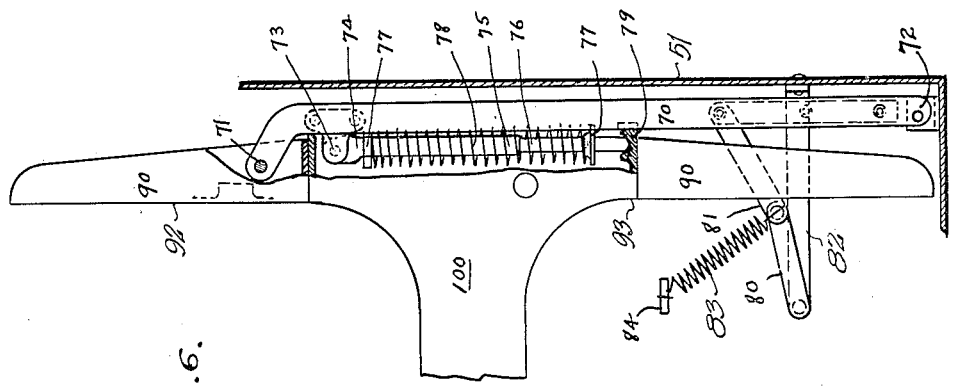

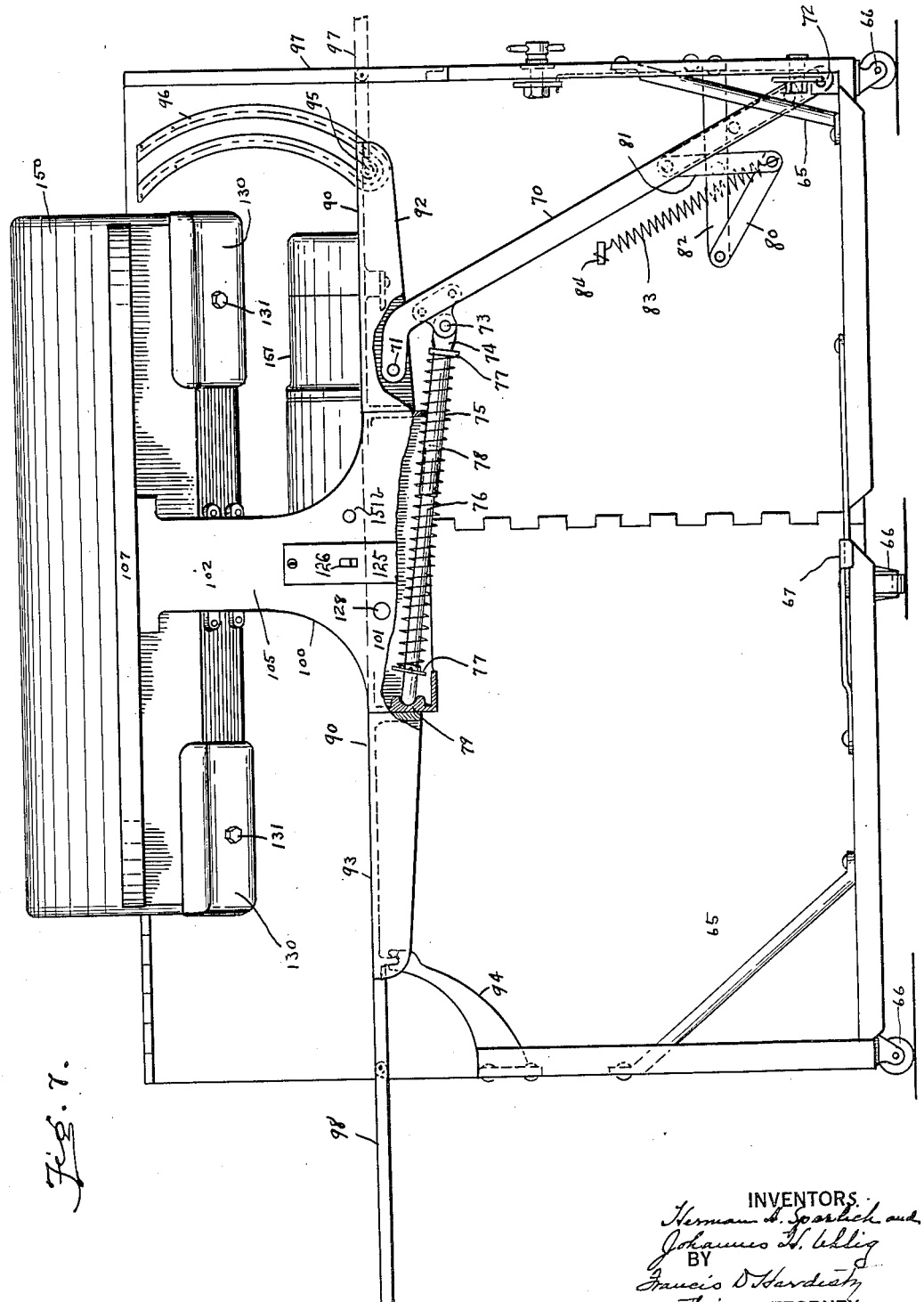

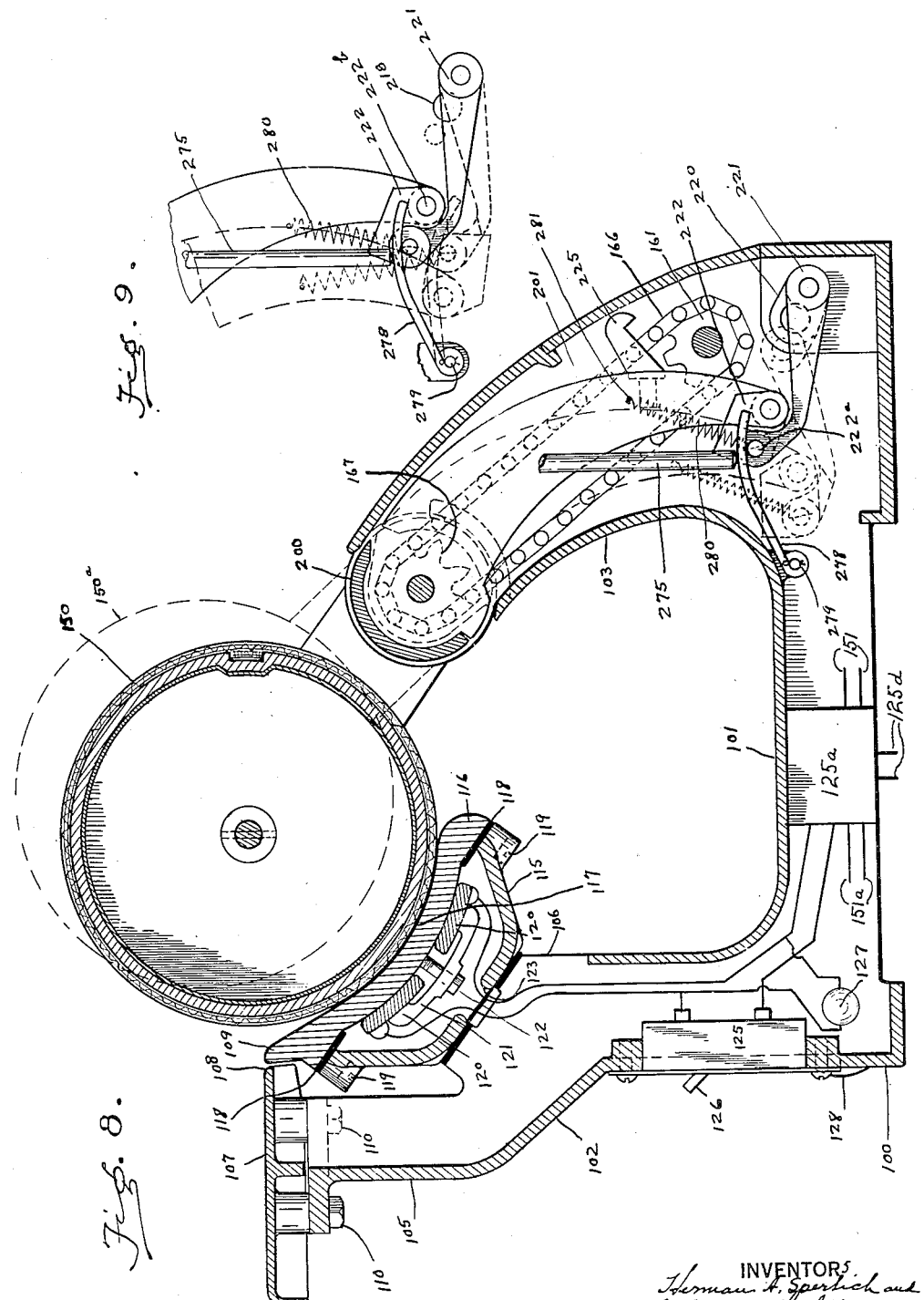

March 8, 1932.  H. A. SPERLICH ET AL  1,848,499
CABINET IRONING MACHINE
Original Filed July 30, 1925  12 Sheets-Sheet 5

INVENTORS
Herman A. Sperlich and
Johannes N. Uhlig
BY
Francis D. Hardesty
their ATTORNEY

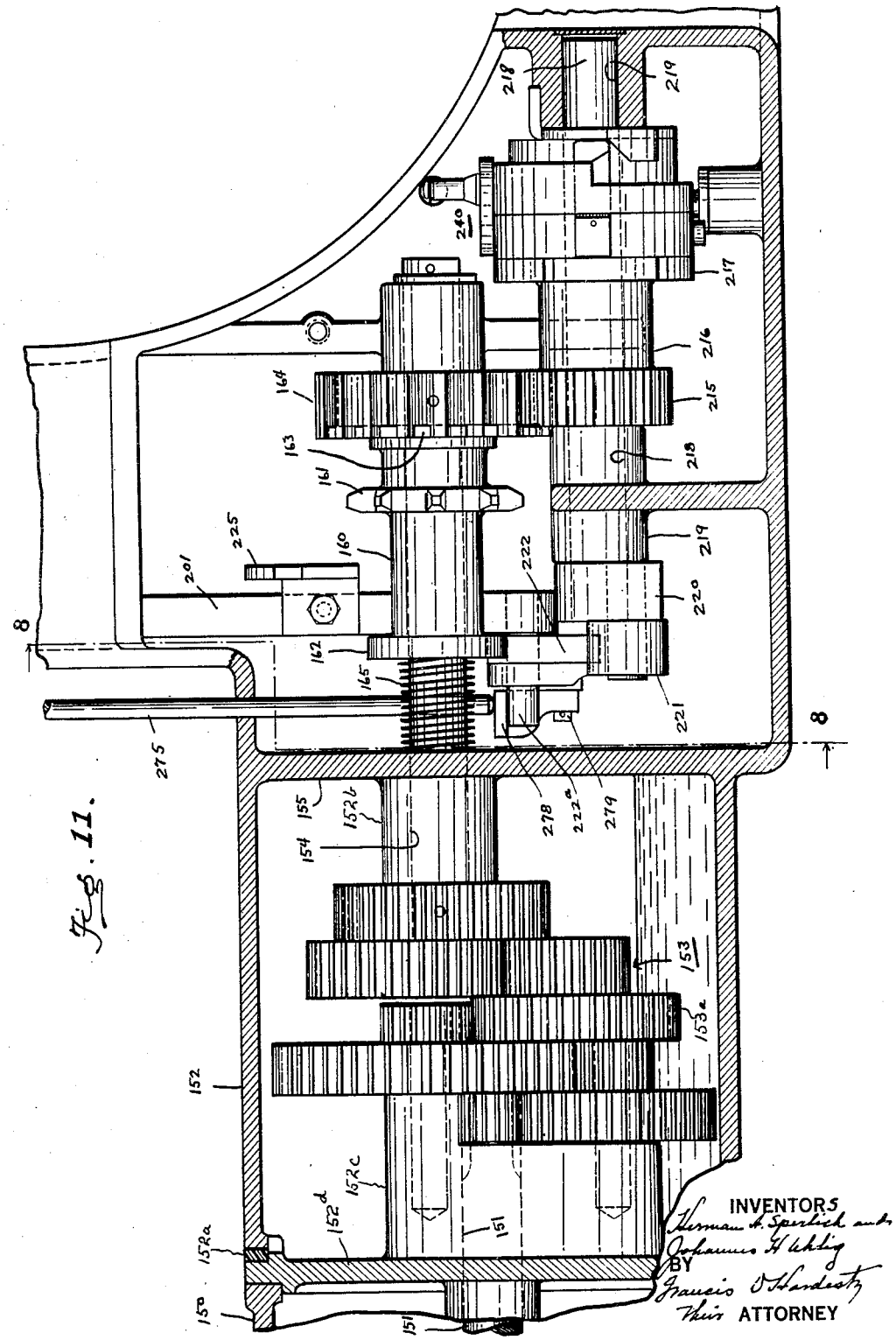

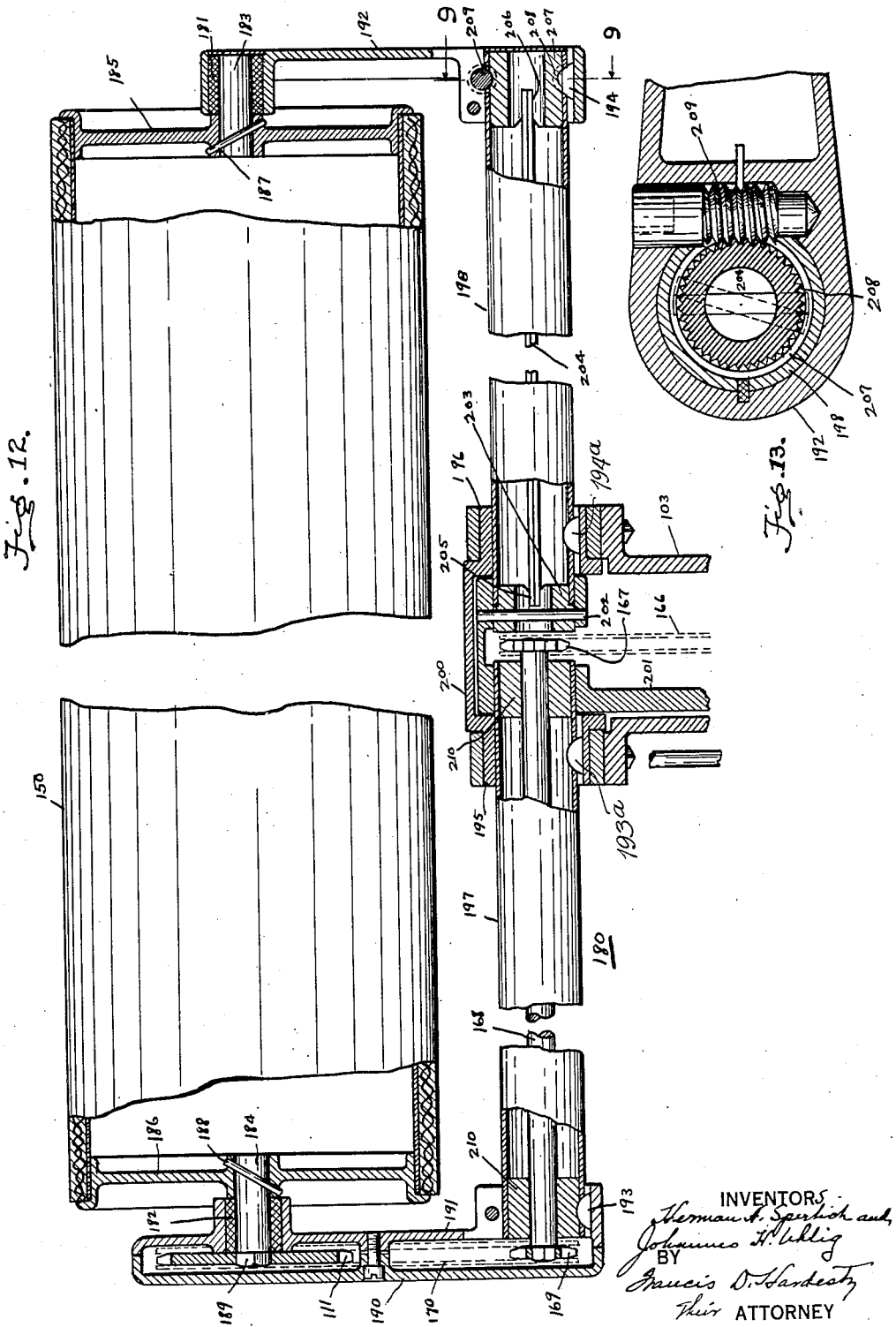

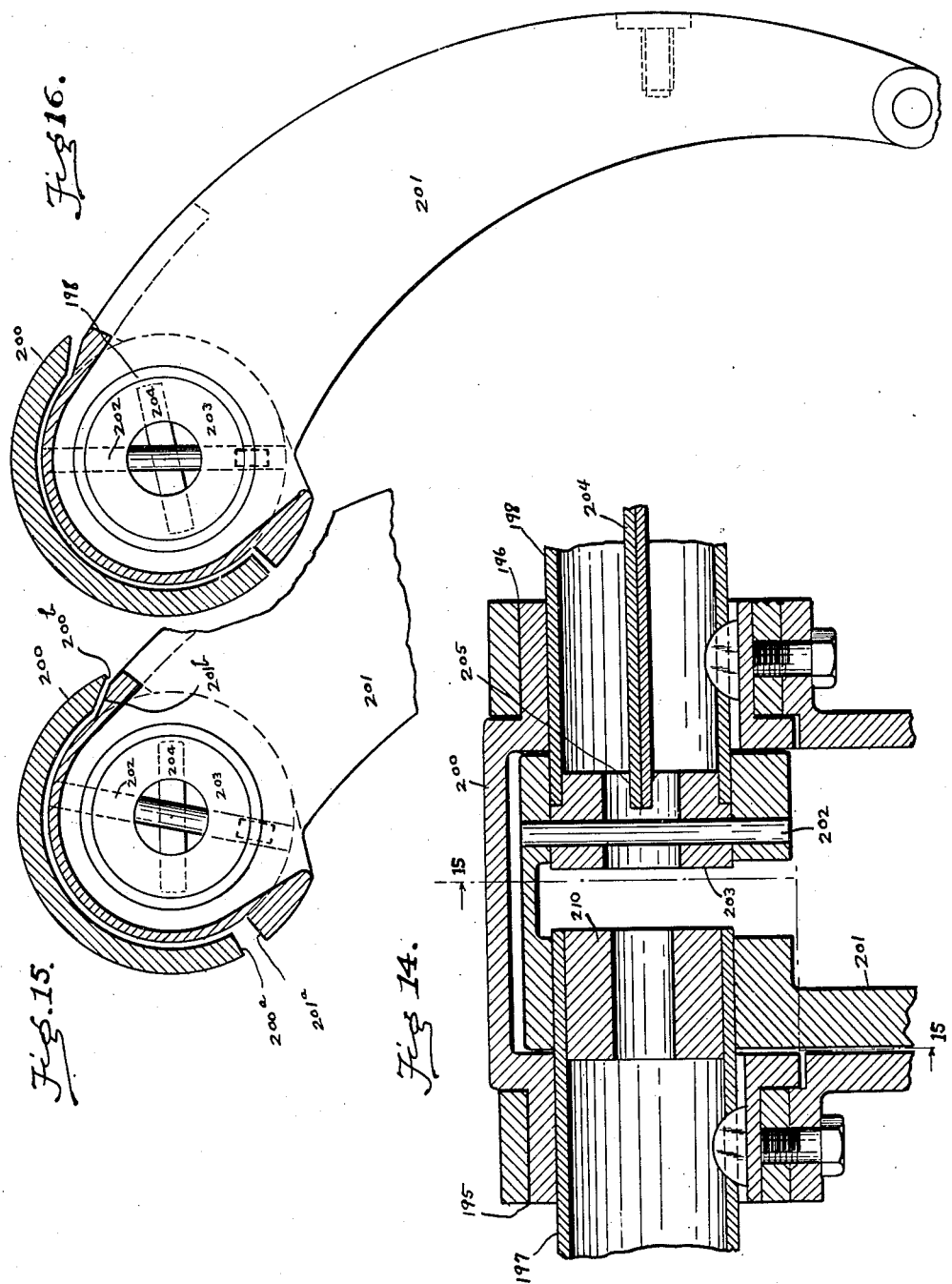

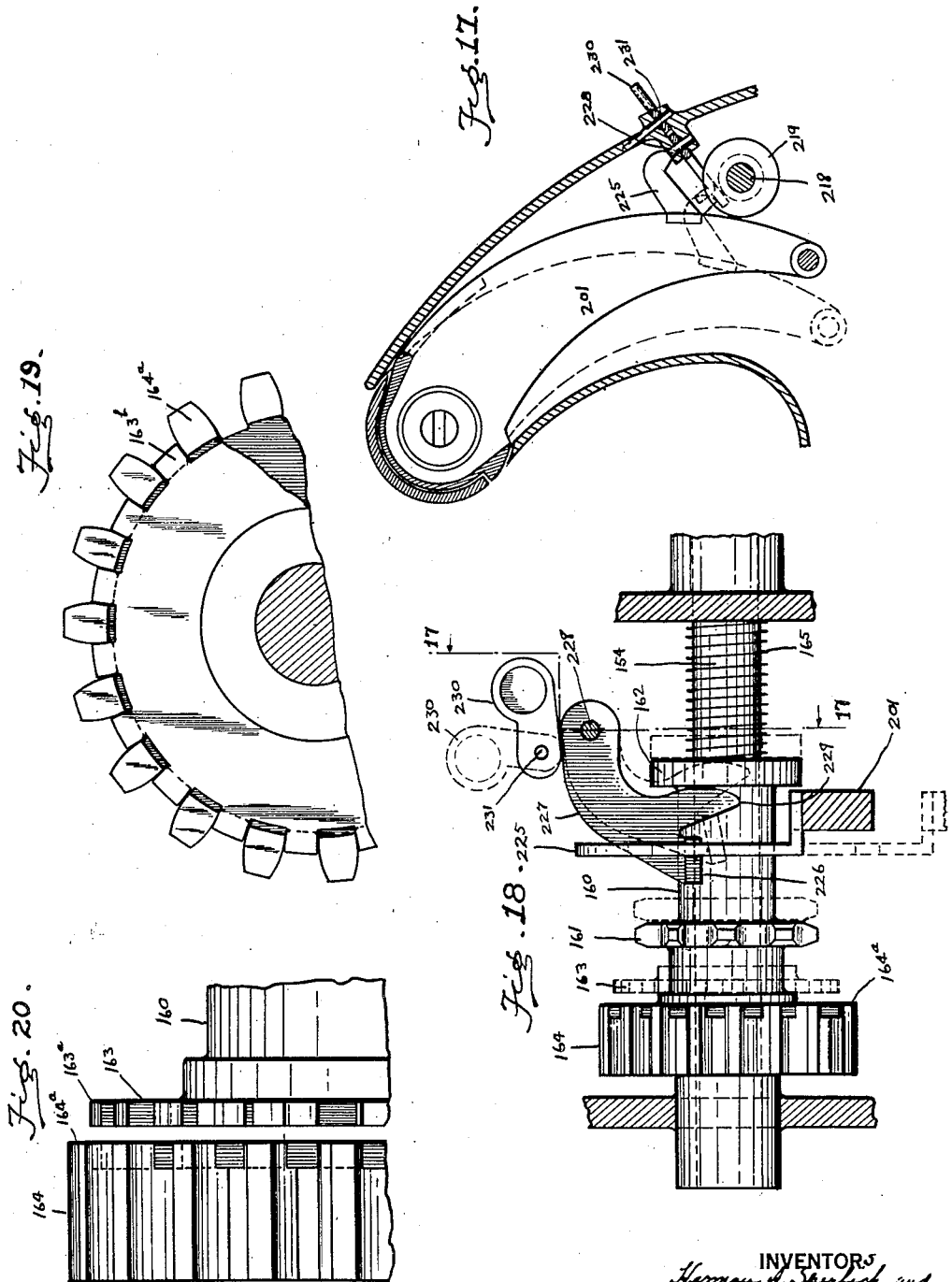

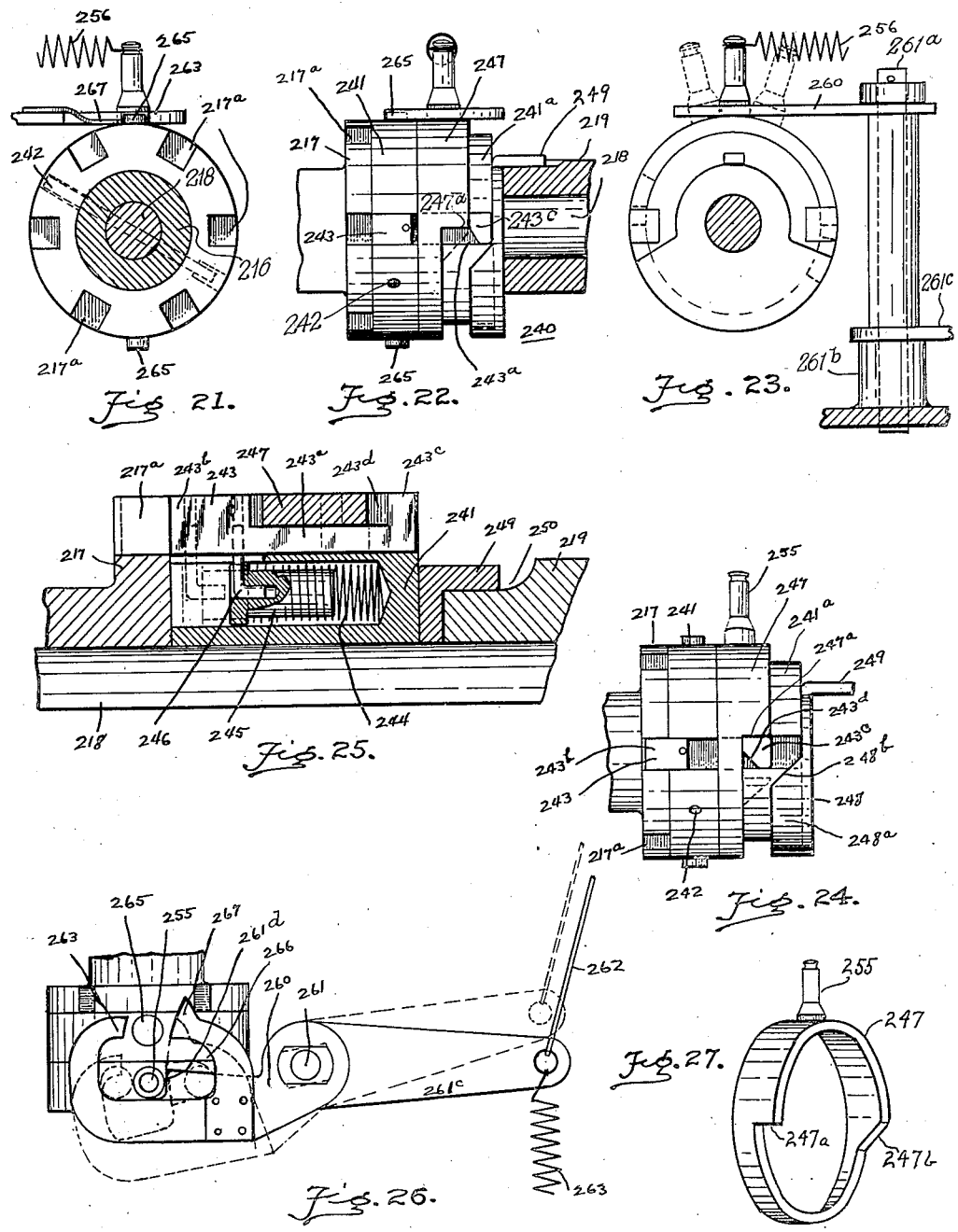

March 8, 1932. H. A. SPERLICH ET AL 1,848,499
CABINET IRONING MACHINE
Original Filed July 30, 1925 12 Sheets-Sheet 11
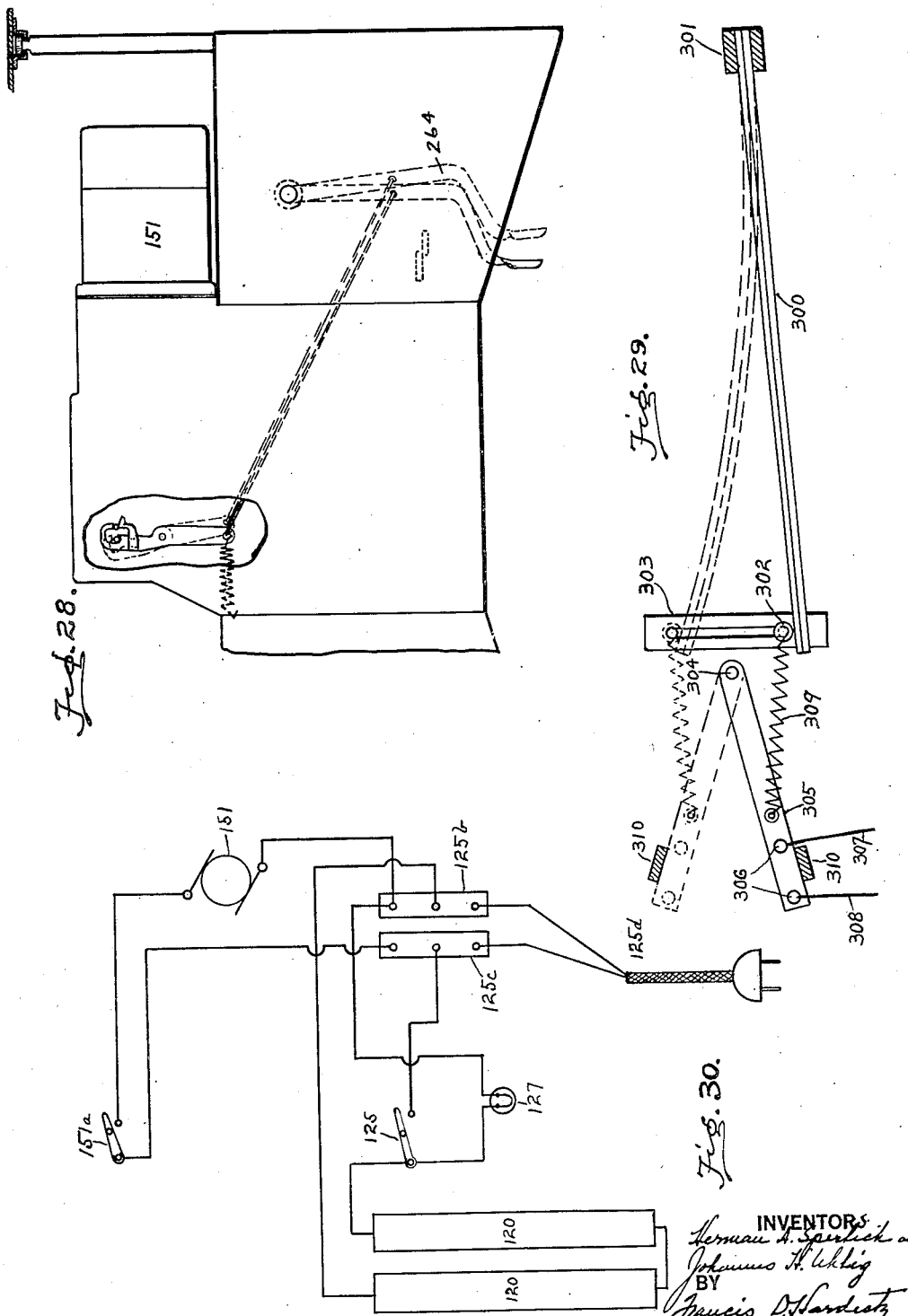

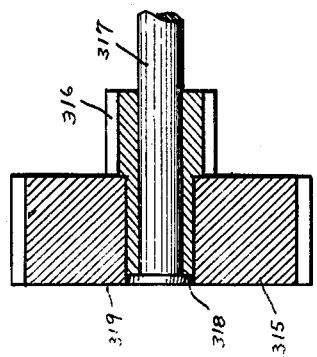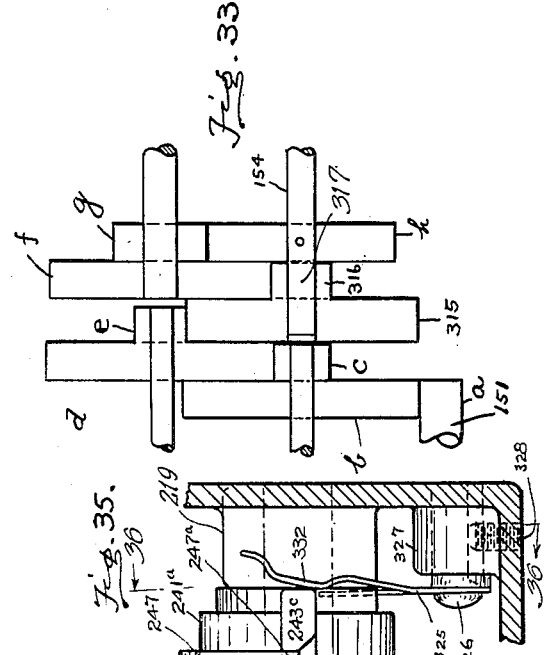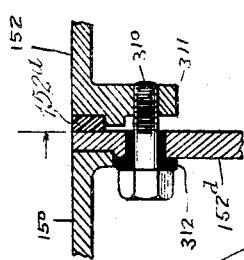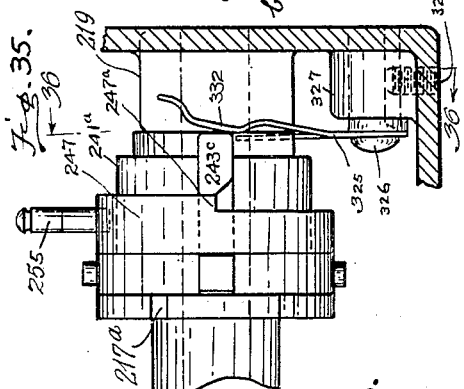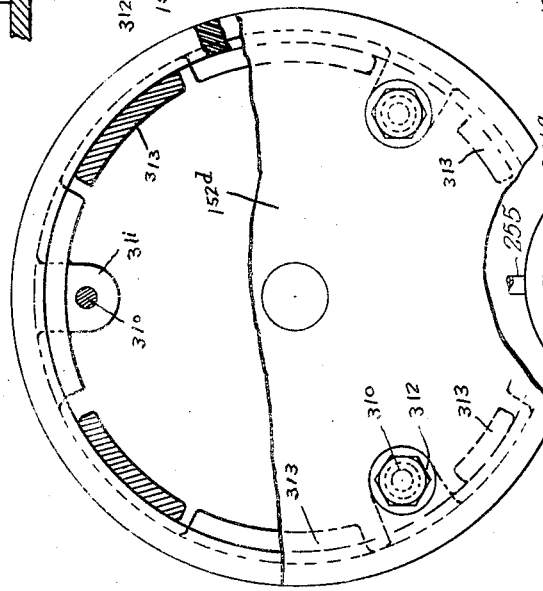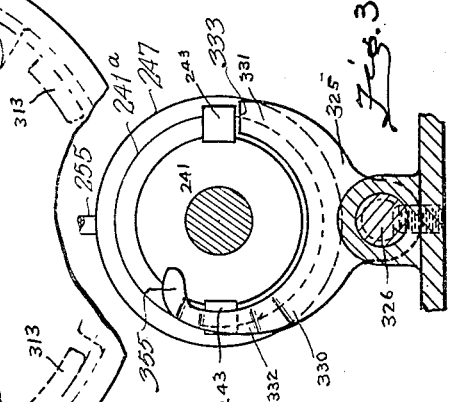

Patented Mar. 8, 1932

1,848,499

UNITED STATES PATENT OFFICE

HERMAN A. SPERLICH AND JOHANNES H. UHLIG, OF DETROIT, MICHIGAN

CABINET IRONING MACHINE  REISSUED

Application filed July 30, 1925, Serial No. 46,958. Renewed August 6, 1931.

The present invention relates to ironing machines and specifically to ironing machines adapted for domestic use.

Heretofore, domestic ironing machines have been devised which, while operating more or less satisfactorily, are usually larger than is convenient in many homes and of limited ironing capacity, capable of operating only on the smaller articles, unless of such overall dimensions that they require to be placed more or less permanently. Others have also been devised in which the operating parts are supported from one end and may be dropped to a vertical position, occupying somewhat less space but still more or less bulky and requiring separate protective covers to prevent their getting dusty and dirty.

The present invention, therefore, has among its objects to overcome these objections and provide a machine of large ironing capacity and comparatively small weight and bulk and one which may be contained within a small cabinet forming part of the machine and completely enclosing it in a dust-excluding manner.

Another object is an ironing machine in which both ends of the shoe and roll are open, and work may be ironed over either end of either roll or shoe, thereby greatly increasing the ironing capacity of a given length of machine.

Still another object is novel mechanism for actuating the moving parts, whereby a minimum of exertion is required of the operator.

Further objects will readily be apparent to those skilled in the art upon reading of the following description, reference being made to the accompanying drawings, in which:

Fig. 1 is a perspective view of the closed machine indicating in dotted lines the position of the mechanism.

Fig. 2 is a similar view showing the cabinet partly open.

Fig. 3 is a view similar to Fig. 1, but looking down on top of the cabinet.

Figs. 4 and 5 are details of the cabinet locking devices.

Fig. 6 is an elevation of a part of the machine in folded position.

Fig. 6a is a detail view on a smaller scale of the supporting leg.

Fig. 7 is a front elevation, with parts broken away, of the machine in operating position.

Fig. 8 is a vertical section through the ironer mechanism on line 8—8 of Fig. 11.

Fig. 9 is another showing of part of Fig. 8.

Fig. 11 is a rear view of the mechanism for driving and oscillating the roll.

Fig. 12 is a partial longitudinal section through the roll and the roll mounting.

Figs. 13, 14, 15, 16 and 17 are details of the roll mounting and operating parts.

Figure 10:
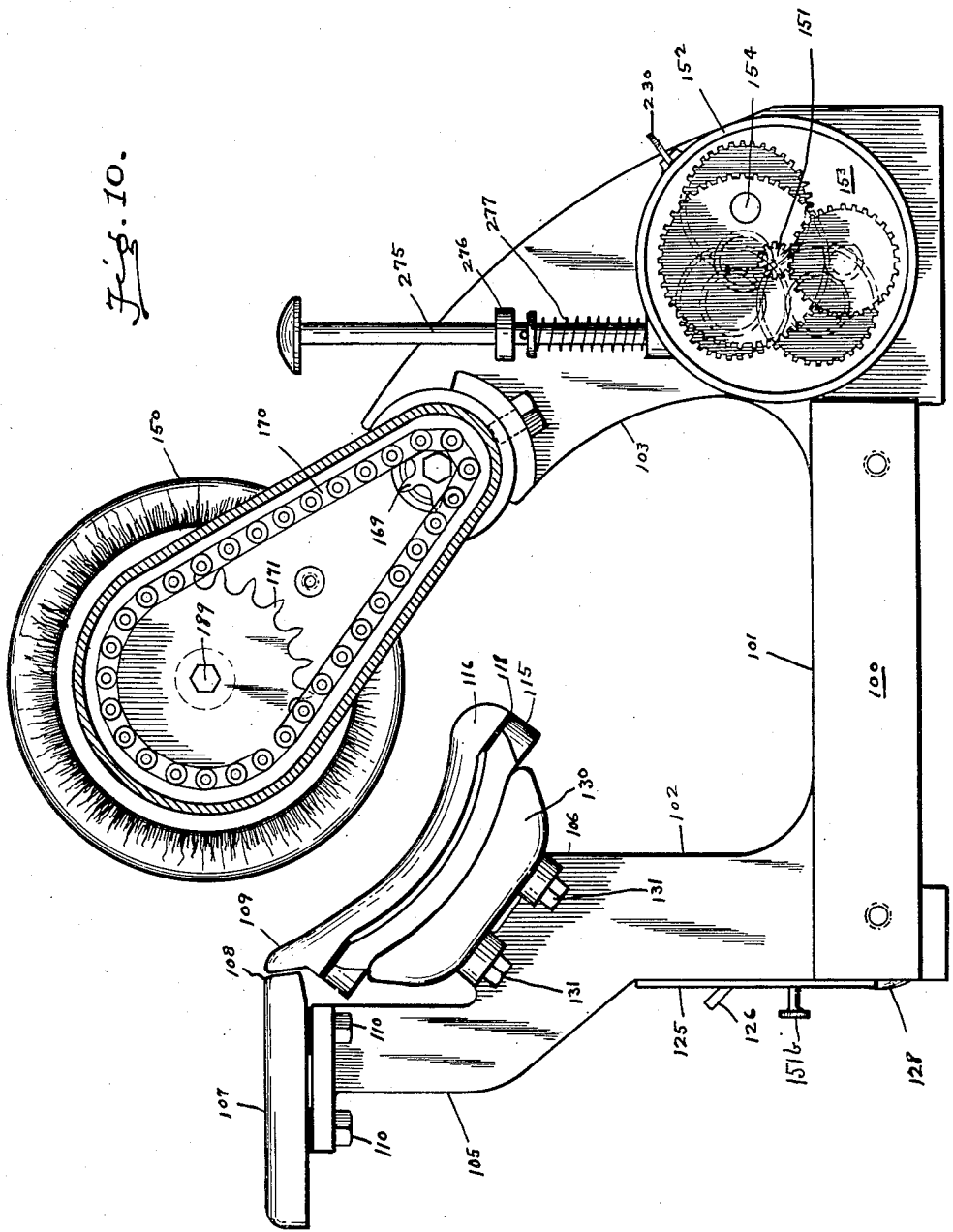
Fig. 10 is an end view of the ironer mechanism showing the roll drive and the motor reduction gearing.

Figs. 18 to 20 inclusive are views and details of the roll driving clutch mechanism.

Figs. 21 to 27 inclusive are views and details of the clutch and control.

Fig. 28 is in detail of the roll controlling lever and its linkage.

Fig. 29 is a more or less diagrammatic view of a thermostatic circuit breaker which may be used to break the heater circuit when the ironing shoes reaches an excessive temperature.

Fig. 30 is a wiring diagram.

Figs. 31 and 32 are details of the joint between the motor casing and the gear housing.

Fig. 33 is a development of the reduction gearing, showing the means of insulating one end from the other.

Fig. 34 is a section through one of the gears.

Fig. 35 is a side elevation of a modified form of the clutch of Figs. 21 to 27.

Fig. 36 is a section on line 36—36 of Fig. 35.

*Cabinet and ironer mounting therein*

As indicated in the drawings, the machine consists of ironing mechanism and drive adapted to be enclosed in a cabinet 50. This cabinet 50 is, when closed, approximately square when viewed from above, and has the four sides 51, 52, 53 and 54, of which sides 52 and 53 are hinged together at 55 as shown. Sides 51 and 52 are fixed together at their angle and to a triangular bottom piece 56, and sides 53 and 54 are also fixed together at their angle and to a second triangular bottom piece 57, thus forming from the two pieces, when 51 and 54 are brought together and secured, a box-like cabinet. The cabinet is completed by a top 58 hinged to side 53, the top 58 being provided with depending flanges 59 on its free sides, which flanges are adapted to fit over the sides 51, 52 and 54 and render the cabinet dustproof and more rigid.

Fastening means for the free edges of sides 51 and 54 is provided and is shown more clearly in Figs. 3, 4 and 5. As shown in these figures, the edges of sides 51 and 54 are turned sharply inwardly to form flanges 51a and 54a and these flanges themselves flanged as at 51b and 54b so as to nest one in the other, thus giving broad flat meeting edges 51a and 54a and also by reason of the nesting flanges 51b and 54b edges that will align automatically. The flanged edges of sides 51 and 54 when brought together are securely fastened by means of two or more buttons 60 operable, independently or in tandem, as shown, through a connecting rod 61 and handle 62, these parts being carried by side 51.

Further, the cabinet is preferably provided with corner braces 65, casters 66, and means for locking it open such as the toggle 67.

As shown clearly in Figs. 1, 2, 3 and 6, when the machine is folded into the cabinet, the ironer (and by "ironer" is meant the mechanism and parts used in the ironing operation) assumes a position wherein the roll etc. are vertical, while in operating position, these are horizontal as shown in Fig. 7. The parts for accomplishing this change in position are shown clearly in Figs. 6 and 7.

In the latter figures, the platform 90 is shown as hinged to a leg 70 as at 71 and the leg is also hinged as at 72 to the bottom member 56 of the cabinet. Leg 70 is preferably formed of two metal bars 70a and 70b so shaped as to have a base substantially as wide as side member 51 and to be nearly as wide at the top as the platform 90, the two bars 70a and 70b being diagonally braced as at 70c (see Fig. 6a).

Hinged as at 73 near the top of bars 70a and 70b are two extensible members 74 formed preferably of tubes 75 into which telescope rods 76 each carrying a fixed collar 77 between which and around the rods are compression springs 78. The free end of rod 76 is rounded and co-acts with a seat 79 in the under side of platform 90.

It should be noted that the upper ends of bars 70a and 70b are bent forward so that the hinge 73 is a short distance in the rear of the line between hinges 71 and 72 and when the ironer occupies the position indicated in Fig. 6, the seat 79 is almost on said line, so that, when the spring 78 is compressed, as it is in Fig. 6, very little effort is required to maintain this state.

The springs 78 are rather heavy, strong springs intended to counterbalance the weight of the ironer both while the latter is in use and while it is being raised or lowered. And, as these springs, as just stated, are under compression when the ironer is folded, and as seat 79 is not lined up with hinges 71 and 72 or beyond this line, it is desirable but not essential that means be provided for maintaining the position of the parts as in Fig. 6, viz., in folded position. This means is shown in Figs. 6 and 7 and consists of a toggle 80—81 between a bar 82 secured to side 51 of the cabinet and bar 70b, and actuated by a spring 83 secured to a knuckle of the toggle and anchored as by lug 84 to side 52 of the cabinet. This toggle 80—81 is so constructed and arranged as to be almost straight when the ironer is folded (see Fig. 6). A comparatively weak spring 83 will therefore lock the ironer in folded position against the strong springs 78. This locking means is not essential as when the ironer is folded and the cabinet closed, the mechanism will stay in folded position without undue pressure upon the cabinet sides.

As indicated in Figs. 6 and 7, the platform 90 is formed most conveniently in three parts bolted or otherwise secured together, the mid portion being part of a central main frame member (to be described later in detail) with the end portions 92 and 93 on each side thereof. To part 92 is hinged the leg 70 which supports this end of the platform, while the other end rests upon one or more arms 94 secured to side 54 as shown in Fig. 7. Part 92 also carries on its rearward edge a roller or slide 95 co-acting with guide 96 on side 52 to assist in folding or unfolding the ironer.

In order to prevent the upper portions of sides 51 and 54 hindering the ironing operation, and also to provide a longer platform for the ironer, the upper part of each side is hinged to the lower as shown in Figs. 2 and 7. Those upper parts numbered 97 and 98 respectively, lap over the lower parts far enough so that when folded down as shown in Fig. 7 they will extend inwardly of the cabinet side to the edge of the platform and form continuations thereof.

Main frame

The ironing mechanism preferably consists as is usual of an ironing shoe adapted to be heated and a padded roll operable to press the garments, or other articles to be ironed, against the shoe and move them over the smooth hot surface thereof, although with minor alterations it is possible to provide for using a roll instead of a stationary shoe and for the heating of either of these two, and such modification is contemplated. It should also be noted that the device is not limited to the use of electric heat, as other heating means may be used.

In the present machine both the ironing shoe and the roll are supported centrally and upon the same U-shaped frame member. This member indicated at 100 has its base 101 extending laterally to form the mid portion of the platform 90, and the lateral extensions are provided with flat ends against which the platform wings 92 and 93 abut and are secured as indicated in Figs. 1, 2, 6 and 7. The arms of the U-shaped frame member which are hollow and are numbered 102 and 103, support respectively the ironing shoe and the roll.

It will be noted that all of the ironing machine proper is supported by the frame member 100. This construction permits detaching the machine from the cabinet structure and placing it upon a table if desired, and for this purpose the U-frame 100 is provided with a flat base portion as shown best in Figs. 7, 8 and 10. The detaching is easily accomplished by lifting rods 76 from the seats 79 and removing hinge pin 71. The machine may then be lifted out of the cabinet by sliding roller 95 out of guide 96.

*Ironing shoe and mounting*

Arm 102 extends for a short distance substantially vertically and then divides into two branches 105 and 106. Branch 105 extends above branch 106 and carries on its top a narrow platform or feed table 107 which extends laterally the length of the ironing shoe and roll and extends forwardly to a point close to the top edge of the ironing shoe, there being a narrow space 109 between this edge and the shoe for the purpose of preventing conduction of heat from the shoe to the table. Table 107 is secured to arm 105 in a suitable manner as by cap screws 110.

To branch 106 of arm 102 is secured a shell 115, which shell is open at its outer side and in turn has secured to it the ironing shoe 116. The latter is a rather thick piece of metal cylindrically concave on its outer surface as at 117 to conform to the shape of the roll with which it co-acts. The part 116 may be of cast iron, or of other suitable metal, such as certain alloys. Shoe 116 is heat insulated from shell 115 as indicated at 118, but secured thereto as by screws 119, and carries upon its under side electric resistance heating elements 120, these being indicated as pressed tightly against the shoe by a yoke member 121 and bolt or screw 122. The wires from said elements 120 pass out of a suitable opening 123 in shell 115 into the hollow arm 102, one of said wires leading to a conventional switch 125 having handle 126 and set in the wall of arm 102, the other wire leading to a junction box 125a.

Although the ironing shoe 116 is heat insulated from the shell 115, the latter is likely to become very hot so that an operator, in reaching under the end thereof to arrange the work or for any other reason, is apt to touch the shell 115 with his arm or hand. There is, therefore, provided at each end of the shell an arm guard 130 (shown best in Figs. 7 and 10). This guard consists of a heat insulating pad secured to shell 115 by means of a cover and screws 131.

*Wiring*

The wiring diagram for the machine is shown in Fig. 30. In this figure the junction box 125a is indicated by the two bus bars 125b and 125c, these being connected to the two wires of cord 125d leading from a suitable source of current.

From bar 125b there is a lead to one end of one of the heater elements 120 and then to the other in series and to one pole of the switch 125. A second lead from bar 125b connects with the same pole of switch 125 through lamp 127. As the other pole of switch 125 connects to bar 125c, closing switch 125 will energize both of these circuits so that the lamp will indicate when the heater current is on and act as a telltale therefor.

The motor 151 is also connected to the two bus bars 125b and 125c in the junction box being controlled by a separate switch 151a, the latter being a conventional pull switch also located in arm 102 of the frame and controlled by button 151b (see Figs. 7 and 10).

In Fig. 8, the leads from the junction box to the motor switch 151a, the motor 151, and the cord 125d are indicated by the numbers of these members.

*Roll driving mechanism*

As mentioned above, the roll numbered 150 is supported on arm 103 of frame member 100. This portion of the frame member 100 furnishes a housing for the roll operating mechanism and to it is also secured a motor 151 for driving the operating mechanism.

In Fig. 11, a portion only of the motor casing is shown at 150 with the motor shaft 151 projecting into the housing 152 for the reduction gearing indicated as a whole by 153. This reduction gearing 153 is spur gearing and in the specific embodiment shown, reduces the motor speed of 1000 to a roll speed of 1. The motor and power take-off shafts are shown at 151 and 154 respectively in Figs. 10 and 11.

The reduction gearing 153 differs from the ordinary gearing of this sort in that means is included for breaking the continuity of a possible electric circuit therethrough. This means comprises means for insulating housing 152 from the motor housing 150 by means of a fibre gasket 152a so arranged as to form an oil-tight and insulating joint. The details of this joint are shown more clearly in Figs. 31 and 32.

In these figures, the motor casing 150 is secured to the end wall 152d in any suitable fashion and the latter is secured to housing 152 by means of screws 310 passing through end wall 152d and into lugs 311 inside of housing 152 and located a short distance from the end thereof. Screws 310 will be insulated from end wall 152d by means of fibre bushings 312. The gasket 152a is positioned by means of segmental flanges 313, which are carried by the two parts 152 and 152d and alternate with a small space therebetween. These flanges fit within the gasket 152a and position it.

Further, any possible circuits through the reduction gearing are prevented by means of a fibre gear interposed in the series as shown in Figs. 33 and 34.

In these figures, the shaft 151 is from the motor, and gears a, b, c, d and e are carried by the end wall 152d of the housing. The remaining gears are carried by the end wall 155 of the housing. The next gear in the series, after the gear e, is a fibre gear constructed as indicated in Fig. 34. In this figure, a fibre gear 315 carries a small pinion 316 which has a projecting lateral sleeve secured in gear 315 in any suitable manner and both are carried on stud 317. The end of the stud 317 and of the bushing 318 in gear 315 will be below the surface 319 of the gear as indicated. Further, as shown in Fig. 33, gear 315 will be somewhat wider than the other gears.

In using the fibre gear 315 as described, it should be noted (see Fig. 33) that, because of the width of gear 315 co-acting with pinion e, which is narrower, there is a space between pinion e and gear f which overlaps it, the gear series being from pinion e through 315 and 316 to gear f. Further, the small air gap shown in Fig. 34 at the end of shaft 317 causes a spacing at this point. The gear train a, b, c, d, e is by these two gaps effectively insulated from gear train f, g, h, the latter being pinned to the power take-off shaft 154.

Further, it should be noted that the reduction gearing 153 is spaced from the walls of housing 152 by the inwardly projecting bosses 152b and 152c, which bosses are sufficiently long so that they extend above the oil level when the machine is turned on either end, the horizontal oil level being about as shown in Fig. 11. This prevents leakage of oil out of the housing 152 when the machine is in folded position.

Shaft 154 projects through wall 155 of the housing 152 into a chamber directly at the base of arm 103 and carries loosely mounted thereon a sleeve 160, which has keyed or otherwise secured to it a sprocket wheel 161. At one end of sleeve 160 is a flange 162 acting as a thrust member by means of which the sleeve may be moved longitudinally of the shaft 154, and at the other end there is a flange 163 notched at its edges to form one member of a dog clutch, the other member of the clutch being formed on gear 164 which is pinned or otherwise fixed to shaft 154. The sleeve 160 is spring-pressed toward clutch engagement by means of a spring 165 acting against wall 155 and flange 162.

Co-acting with sprocket 161 is a chain 166 which leads up within arm 103 to another sprocket 167 as shown in Figs. 8 and 12. The latter sprocket 167 is mounted upon a shaft 168 by means of which the drive is transferred to the end of roll 150. Shaft 168 carries another sprocket 169 which through chain 170 drives sprocket 171 secured to the end of roll 150, as shown in Fig. 12.

*Roll supporting mechanism*

As is desirable in ironing machines, the roll 150 has two distinct movements, viz., rotary and the movement toward and away from the ironing shoe 116. The rotation of the roll has been described under the caption "roll driving mechanism" and the supporting mechanism, allowing oscillation, will now be described as the roll "supporting" mechanism.

It will be noted, particularly from Figs. 7 to 12, that roll 150 is mounted upon arm 103 of frame 100, located centrally of the roll and that this mounting is by means of a yoke— indicated as a whole in Fig. 12 by numeral 180—which spans the roll and furnishes bearings 181 and 182 for the ends thereof, the roll being supported in said bearings by shaft portions 183 and 184 extending outwardly from the spiders or disks 185 and 186 forming the roll ends. Shaft 183 is merely a short piece keyed or pinned in disk 185 by pin 187, but shaft 184, while secured in the same manner, i. e., by pin 188 to disk 186, extends through bearing 182 and has its free end of hexagon or other suitable shape as shown at 189 in Figs. 10 and 12. This hexagon shaped end fits into and makes a driving connection with sprocket 171. The same sort of driving connection is used with sprocket 169 and shaft 168, both sprockets being prevented from coming off the shafts by means of the cover plate 190, secured to arm 191 of the yoke, the arm and cover forming a housing for this part of the drive. It is, of course, obvious that additional retaining means such as cotter pins may be used to prevent the sprockets coming off the shafts.

The arms 191 and 192 of yoke 180 are keyed to the ends of a tubular horizontal member (described in detail later) by means of keys 193 and 194, which member is supported in bearings 195 and 196 in the upper end of casting arm 103.

The horizontal tubular member mentioned is made of two short tubes 197 and 198 keyed into the ends of a connecting piece or journal knuckle 200 by means of keys 193a and 194a which is directly supported in the bearings 195 and 196, and which serves as a cover for the upper end of arm 103. Knuckle 200 is, at its mid portion, semi-cylindrical and inside of it is located the upper end of the actuating arm 201, this latter being loosely supported upon the inwardly extending ends of tubes 197 and 198.

The actuating connection between arm 201 and yoke 180 is as follows.

Arm 201 is secured rigidly, as by pin 202, to a block 203 fitting movably in the inner end of tube 198. This block 198 furnishes an anchorage for one end of a spring 204, illustrated as a laminated torsion spring, fitting in a slot 205 in block 203, though other forms of spring may be used. The other end of spring 204 is seated in slot 206 in block 207 adjustably fixed in the outward end of tube 198, and means is provided for adjusting the tension on the spring. Actuation of the roll by the arm 201 is therefore through pin 202, block 203, spring 204, block 207 and tube 198, the last being functionally an integral part of yoke 180, which is thus actuated as a whole.

The adjustment of spring block 207 is shown most clearly in Fig. 13. In this figure, tube 198 is shown as keyed to arm 192, with block 207 therein. The latter is shown as provided with a peripheral worm pinion portion 208, adapted to co-act with a worm 209 carried in arm 192.

Tube 197 carries in its ends the two blocks 210, forming bearings for shaft 168.

The connections and operation of arm 201 with the spring 204 are shown in the enlarged detail views in Figs. 14, 15 and 16, the latter two being sections on line 15—15 of Fig. 14, while Fig. 14 is an enlargement of a part of Fig. 12 with certain parts omitted.

As may be seen from these figures, when arm 201 is moved to the right and the roll 150 thereby lowered against the ironing shoe 116, there is permitted a small amount of relative movement between the member 200, connecting tubes 197 and 198, and the head portion of arm 201, which as already stated fits under the semi-cylindrical part of member 200.

In order to prevent too much relative movement, the edges 200a and 200b are adapted to abut shoulders 201a and 201b formed on the head portion of arm 201. In making the assembly, the spring 204 is so adjusted that the parts 200a and 201a come together when the roll is raised and sufficient tension is added to produce a pressure of about 100 pounds between the roll and shoe when the former is lowered. In lowered position of the roll the parts 200a and 201a are separated by a small distance so that the required ironing pressure may be on the thinnest materials constituting the work.

Further, as a torsion spring under these conditions has substantially a straight line stress curve, the pressure on the work is substantially the same regardless of the thickness, until the parts 200b and 201b come together. But, as a small movement at the radial distance of shoulder 201b from the center of movement corresponds to a much larger movement by the roll, the limit of thickness of work is beyond that which it is practicable to operate upon.

*Roll actuating mechanism*

Under this caption will be described the means for moving the arm 201 for the raising and lowering of the roll 150 and reference is made chiefly to Figs. 11 and 17 to 27 inclusive.

As mentioned in connection with the roll driving mechanism, shaft 154, leading from the reducing gearing, has secured upon it a gear 164, and this gear forms one member of a dog clutch, the other member being a toothed flange 163 on sleeve 160. The gear 164 has one face machined away leaving the teeth 164a projecting from the side as indicated in Figs. 18, 19 and 20, so that the teeth 163a of flange 163 fit in between the projecting portions, thus forming a positive drive for the sleeve 160.

When the sleeve 160 is in the position shown in Fig. 11, the clutch 163—164 is engaged and consequently the sprocket 161 is driving the roll 150 through the connections already described and at the same time gear 164 is driving a gear 215 which forms part of a sleeve 216, having at its other end a flange 217, which sleeve is loosely carried on a shaft 218, mounted in bearings 219 in the drive housing.

Through the agency of a clutch, indicated as a whole by numeral 240, the sleeve 216 and gear 215 will rotate shaft 218 which carries at one end a crank arm 220 adapted to operate a pitman composed of links 221 and 222 connected to the bottom end of arm 201. (See description of Figs. 8 and 9 for explanation of pitman construction.) Thus, when clutch 240 operates to connect sleeve 216 to shaft 218, the arm 201 is moved and consequently the roll 150 will be moved up or down.

When the roll 150 is raised, the arm 201 will, of course, be in the position shown in dotted lines in Figs. 8, 17 and 18, and, in this position, the clutch members 163 and 164 will be out of engagement, as in Fig. 20. This disengagement is accomplished by a hook 225 secured to arm 201 acting on a flange or step 226 on the throw-out lever 227. This lever 227 is hinged to the housing as at 228 and has a part 229 operating on flange 162 of sleeve 160 so that when the arm 201 is moved to the left (see Fig. 17) hook 225 acting on lever 227 causes the sleeve 160 to move toward the right (Fig. 18) thus disengaging clutch 163—164 and at the same time compressing spring 165. Correspondingly, when the arm 201 moves to the right (Fig. 17) the reverse action takes place and the clutch 163—164 is engaged so that the roll 150 is driven.

For a purpose to be described later, lever 227 may be held in its clutch disengaging position by means of a hand operated cam piece 230 hinged in the housing at 231. When this piece 230 is in the dotted line position as shown in Fig. 18, the arm 201 may operate repeatedly without rotation of roll 150.

As so far described, when the motor is operating, and clutch 240 engaged, the roll 150 would be oscillated up and down repeatedly and would start and stop rotation with each oscillation.

In order that the roll 150 may be properly controlled and held up or down as desired, the clutch 240 is designed to be operative for only one-half revolution of shaft 218, thus swinging arm 201 from one of the positions in Fig. 17 to the other. The clutch then automatically releases and the shaft is positively stopped and held until such time as the operator sees fit to operate the roll again.

Clutch 240 consists of the driving flange or notched clutch disc 217 on sleeve 216 and the driven member or clutch body 241 which is fixed to shaft 218 as by pin 242. Clutch body 241 carries in suitable slots two sliding keys 243 adapted to slide laterally of the body and engage slots 217a in disc 217, each key 243 being spring-pressed toward engagement by means of a spring 244 located in a seat beneath the key slot, which spring operates on a plunger 245 connected to the key 243 by suitable means such as the pin 246.

Each of the keys 243 is provided with a base portion 243a, which carries at one end a deeper rectangular engaging portion 243b and at its other end a deeper portion 243c with a cam face 243d which is the operating part.

It will be noted that body 241 has a part of the same diameter as disc 217, with a smaller diameter portion 241a, around which is a ring 247 which will be called the cam ring. This ring is wider in its upper half than in the lower and lies over the keys 243 between the ends thereof. The wider portion of ring 247 is stepped down to the narrower portion abruptly on one side as at 247a and slopes down on the other side as at 247b forming a cam surface.

Also, partly surrounding part 241a of the body 241 is a cam member 248 which consists of a disc, flanged about a portion of its periphery as at 248a, the ends of the flange being cam surfaces as at 248b. Member 248 is also provided with a lateral tongue 249 adapted to lie in a groove 250 in bearing member 219 in order to prevent its rotation.

Cam ring 247 is provided upon its upper side with a post 255 to which is connected a spring 256, anchored at its other end to the housing, in such fashion as to tend to draw the post toward the right of Fig. 23, or to the rear of Figs. 22 and 24.

The clutch 240 is controlled by means of a lever 260 secured as at 261 to a vertical shaft 261a supported in bearing 261b and having secured to its other end an arm 261c to which is secured link 262 and spring 263, the link being connected to a hand lever 264 projecting from the front of the machine (see Figs. 2, 26 and 28).

Lever 260, at the clutch end thereof, is roughly C-shaped, as shown in Fig. 26, and the post 255 is embraced thereby. Inside of said C-shaped end there is a shoulder 261d against which post 255 normally rests, and, when this is the case, the parts are as in Fig. 22, that is, sliding key 243 has its operating part 243c held out of engagement with disc 217 by the corner 247a of ring 247. Further, one of two stops 265 provided on body 241 (see Fig. 21) is held by the overhang 263 of the C and the body thus prevented from being dragged around by the disc 217.

When the lever 264 is operated and consequently lever 260 moved to the position indicated by the dotted lines in Fig. 26, the shoulder 261d moves away from post 255 and the spring 256 immediately pulls the post (to the right in Fig. 23) into the bottom slot 266 of the C and allows part 243c of key 243 to move to the left (Fig. 24) and consequently put the key in position to slide into one of the slots 217a in disc 217 when it comes into registry, this sliding being caused by spring 244. At the same time, overhanging end 263 of lever 260 is removed from the path of stop 265 allowing the body 241 to move with disc 217 as soon as the key 243 engages a slot 217a. If for any reason the key 243 does not fully engage a slot 217a, as soon as the body 241, and therefore also the key 243, begins to move, the part 243c will strike cam surface 248b of cam piece 248 and the key 243 will be forced into and retained in full engagement thereby for one-half a revolution.

When the half revolution has been completed, the part 243d of the key 243 strikes the cam surface 247b on ring 247 and is withdrawn from disc 217. When this happens the post 255 is by friction and cam resistance drawn out of slot 266 in the C and the latter allowed to resume the position shown in full lines in Fig. 26, in which position the overhang 263 acts with stop 265 to prevent further movement of body 241.

The two keys 243 alternately function as just described and each is alternately idle.

Further, in order to prevent backward motion of the body 241 a second stop 267 is provided. This is the lower jaw of the C and is wide enough so that it is always in active position, being made of a flat spring piece under which the stops 265 may pass when the body 241 is moving in the right direction.

In operating machines in which the roll, or ironing shoe, as the case may be, is raised or lowered by the motor used also for rotating the roll, it sometimes happens that the motor will stop with work under the roll. For example, a fuse may burn out or some other mishap may occur to break the motor circuit. In such cases it is very important that means be present by which the roll may be lifted quickly without aid from the motor. Such a means is shown in the present embodiment in Figs. 8, 9 and 10.

In Fig. 10 there is shown a vertically placed rod 275 extending down into the housing for the actuating mechanism, guided by the guide lug 276, and retained in its upward position by spring 277. Figs. 8 and 9 show the lower end of rod 275 as resting on a lever 278 hinged to the housing as at 279. The free end of lever 278 rests on the extended portion of pin 222a which connects link 222 to pitman 221. Further, there is a spring 280 which extends between pin 222a and an anchoring lug 281 or the like on arm 201.

The action of this release is illustrated best in Fig. 9. In this figure with the parts in position as illustrated in full lines, the roll is down on the ironing shoe, and the pin 222b, which connects arm 201 to link 222, is below the line between pin 222a and pin 221a, which is the crank pin for crank 220, and held in this relation by spring 280. However, when the lever 278 is depressed and this relation changed to bring pin 222b above the line, the roll spring 204 will cause the arm 201 to move forward until pin 222b is in a position forward of pin 222a, whereupon the spring 280 will lift pin 222a so that the parts occupy the position illustrated in dotted lines in Fig. 9. In the latter position, the roll is somewhat above the normal lifted position and any work may be removed from the iron.

Upon again starting the motor, and operating clutch 240, the parts will automatically resume the relation shown in full lines in Fig. 9.

When it is desired to use the machine for pressing, rotation of the roll is undesirable. Therefore, means is provided for rendering clutch 163—164 inoperative to drive the roll. This means is the cam piece 230 in Figs. 17 and 18 acting as already described.

In the operation of ironing machines, it sometimes happens that the operator, through forgetfulness or for some other reason, upon leaving the machine for a time, fails to turn off the heating circuit. If this happens when the roll is on the ironing shoe, the roll is apt to become injured through burning the padding and there is also the fire danger.

To provide against mishaps of this kind, there may be placed in the heater circuit a thermostatic circuit breaker operating at a temperature a little above the proper ironing temperature. Such a device is indicated diagrammatically in Fig. 29.

In this figure there is indicated a bi-metallic bar 300 located preferably within shell 115 so as to be within the heating influence of the heater 120 or ironing shoe 116. This bar is anchored at 301 and its free end is adapted under the influence of heat to slide the anchor post 302 in slotted guide 303 to the position indicated in dotted lines.

Adjacent the guide 303 as at 304 is pivoted a switch lever 305 adapted when in the full line position shown to bridge the contacts 306 and thus complete a circuit from lead 307 to lead 308.

To lever 305 is connected a spring 309 secured at its other end to post 302.

Therefore, when the bar 300 under influence of heat assumes the position, or approximately so, indicated in dotted lines it will have moved post 302 beyond point 304 and the spring 309 will cause lever 305 to leave contacts 306 and assume the dotted line position, thus breaking the circuit from lead 307 to lead 308 and the circuit will remain so until voluntarily re-set. Suitable stops 310 will be provided for the lever 305.

From the foregoing description it will be seen that the present machine is one which, when in inoperative or folded position, is compacted into very small space, and is reasonably light in weight. Further, with a short roll open at both ends, its ironing capacity is greater than any machine with both ends of the roll closed and as great or greater than any having one end open, regardless of the length of roll used. And, by the use of the type of roll support and pressure spring, a substantially uniform pressure upon the work is obtained, regardless of the thickness.

Further, although the present description is specific to a single electric motor both for rotating and actuating the roll, it should be understood that where the term "motor" is used, it is intended to be construed in its broad sense of a prime mover, whether the operating medium be electricity, steam, hydraulic power, or other source of energy. It should also be understood that under some conditions it may be found desirable to use two motors, one for rotating the roll and one for actuating the movable element, i. e. opening and closing the space between the cooperating ironing elements, whether this be through moving one of the elements or the other, or both.

In the modified form of clutch shown in Figs. 35 and 36, the element 248 is eliminated and in its place is used the spring member 325. This member consists of a spring yoke secured to a pin 326 adapted to be secured in a boss 327, formed in the housing below the bearing 219, by means of a set screw 328. This yoke has two arms 330 and 331 embracing a reduced portion of part 241a of the clutch body 241. Arm 330 has a cam-shouldered raised portion 332 which rides up on the end of a key 243 as shown in Fig. 35 and when the shoulder 247a is removed from behind the key portion 243c, the spring arm 330 promptly pushes the key into a slot 217a. In this form of clutch, keys 243 will be somewhat longer than in the other form described, and it will not be necessary to use the parts 244 to 246. Further, the other arm 331 will act as a stop against backward movement of the clutch body by furnishing an abutment 333 on its end for the end of a key 243, so that the stop 267 may also be omitted.

The bent tip 335 on arm 330 serves to prevent motion of the spring arm too far forward. This tip will rest against the end of clutch body 241.

Having now described the invention and the preferred form of embodiment of the same, it is to be understood that said invention is not to be limited to the specific details of the description and illustration but only by the scope of the claims which follow.

We claim:

1. In combination, an ironing machine and an extensible cabinet therefor in which said machine may be housed when not operating, the cabinet structure including means forming the machine support when the machine is in operating position, said cabinet comprising parts movable relatively in a horizontal direction whereby it may be extended to provide a larger base area when said machine is operating than when housing said machine.

2. In combination, an ironing machine, an extensible cabinet releasably connected to and housing said machine when the latter is not in operating position, the cabinet structure including means forming the machine support when the machine is in operating position and having other parts adapted to provide work supporting surfaces when the machine is in operating position, said parts otherwise forming part of the walls of said cabinet.

3. In combination, a normally horizontal ironing machine, a cabinet therefor, including a pair of parallel supporting walls and means to support said machine, said means comprising a stop for one end of the machine and secured to one of said walls, and a leg pivoted to the other of said walls and to said machine adjacent the other end thereof on the under surface, said stop preventing movement of the end of the machine supported thereby in a downward direction, the wall supporting said stop being movable so that the stop can be moved from under the machine.

4. In combination, a normally horizontal ironing machine, a cabinet therefor, including a pair of parallel supporting walls and means to support said machine, said means comprising a stop, for one end of the machine and secured to one of said walls and a leg pivoted to the other of said walls and to said machine adjacent the other end thereof on the under surface, said stop preventing movement of the end of the machine supported thereby in a downward direction, said leg being bent adjacent the end thereof that is pivoted to the base to provide a second stop means for the latter, the wall supporting said stop being movable so that the stop can be moved from under the machine.

5. In an ironing machine, a roll and means to support the roll, said means comprising a leg (103), branches (197 and 198) extending outwardly therefrom, and roll supporting arms extending from said branches, the arms being only slightly longer than the radius of the roll, said leg being intermediate said arms and also the ends of said roll, said branches extending along said roll closely adjacent its outer surface, so that the ends of the roll are substantially free, said leg being supported to form a support for the branches, arms, and the roll.

6. In an ironing machine, a shoe and a roll, a yoke for supporting said roll, said yoke having a leg portion and being supported by means of its leg portion, the latter being intermediate the ends of the roll, and a leg for supporting the shoe intermediate its ends, whereby said roll and said shoe each present ends free for use.

7. In an ironing machine, a roll, an ironing shoe, a U shaped member for supporting said roll, the base portion of said U shaped member being closely adjacent to said roll, and a leg for supporting said U shaped member intermediate the ends thereof, means actuating on said leg to move the U shaped member and the roll as a unit, toward and away from said shoe, the ends of said roll being free of obstructions so as to be free for use in ironing tubular articles which may be slipped over said ends.

8. A support for the ironing roll, the shoe, and the feed table of an ironing machine, said support comprising a base, legs extending therefrom on opposite sides thereof, one of said legs supporting the roll and being disposed intermediate the ends thereof, the other leg supporting the shoe and the feed table.

9. A support for the ironing roll and the shoe of an ironing machine, said support comprising a base, legs extending therefrom on opposite sides thereof, one of the legs being secured to the shoe so as to support the latter, branches extending outwardly from the other of said legs, and arms extending outwardly from the free ends of said branches, the arms being secured to the roll so as to support the latter.

10. In combination, an ironing machine and a cabinet therefor, a supporting leg hinged in said cabinet and to the ironing machine frame for supporting one end of said machine, means secured to said cabinet upon which the other end of said machine rests when in horizontal position, said hinged leg permitting the moving of said other end off of said supporting means thereby allowing swinging said machine to a vertical position in said cabinet and means for counterbalancing the weight of said machine during the swinging operation.

11. In an ironing machine, a roll, an ironing element, means for heating the element, said roll and element each being supported from a point intermediate its ends, whereby both ends are free for use.

12. In an ironing machine, a roll, an ironing shoe, means for heating the shoe, said roll and shoe each being supported from a point intermediate its ends, whereby both ends are free for use.

13. In an ironing machine, a rotatable roll element and an ironing shoe element, one of which elements is in a fixed position and the other of which is movable toward and away from said fixed element, each of said elements being carried upon an arm located intermediate its ends, both ends of each of said elements being free of obstructions so as to be free for use in ironing tubular articles whose diameter is not much greater than the diameter of said roll element.

14. In an ironing machine, ironing elements, a U-shaped frame for supporting said elements, said frame being located centrally with respect to said elements and having its base extended laterally to form a supporting table for work passing between said elements.

15. In an ironing machine, a U-shaped frame located centrally with respect to the ironing elements, the base of which is extended laterally to form a supporting table for work passing between said elements, and the arms of which support respectively an ironing shoe and a roll.

16. In an ironing machine, a U-shaped frame, each of the arms of which supports one of the co-acting ironing elements, one of said arms housing means whereby the element supported by it may be moved toward and away from the other element.

17. In an ironing machine, a U-shaped frame located centrally with respect to the ironing elements, the base of which is extended laterally to form a supporting table for work passing between said elements, and the arms of which support respectively an ironing shoe and a roll, one of said arms housing means whereby the supported element may be moved toward and away from the other.

18. In an ironing machine, a U-shaped frame supporting on one branch an ironing shoe and upon the other a roll, said frame and branches being intermediate the ends of said shoe and roll, thus leaving free for use both ends of said shoe and roll.

19. In an ironing machine, a U-shaped frame supporting on one branch an ironing shoe and upon the other a roll, means within the roll supporting branch for moving said roll toward and from said shoe.

20. In an ironing machine, a U-shaped frame supporting on one branch an ironing shoe and upon the other a roll, and means within the roll supporting branch for rotating the roll.

21. In an ironing machine, a U-shaped frame member having hollow arms one of which supports an ironing shoe and the other of which carries at its outer end a supporting yoke and roll supported thereby and encloses means for actuating the yoke to move the roll toward and from the shoe.

22. A roll supporting means for ironing machines comprising a yoke spanning said roll, said yoke having hollow arms in one of which is housed means for rotating said roll.

23. In an ironing machine, a rotatable roll, a cooperating ironing element, a support for said roll comprising a yoke and means between the stem and arms of said yoke for causing yielding pressure of said roll against said co-operating ironing element.

24. In an ironing machine, a rotatable roll, a cooperating ironing element, a support for said roll comprising a yoke including means for causing yielding pressure of said roll against said co-operating ironing element.

25. In an ironing machine, a rotatable roll, a support for said roll comprising a yoke having hollow arms, driving means for said roll housed in one of said arms, and means in the other of said arms for causing yielding pressure of the roll against an ironing shoe.

26. In an ironing machine, a rotatable roll, a support for said roll comprising a yoke having hollow arms, driving means for said roll housed in one of said arms, and a torsion spring in the other of said arms for causing yielding pressure of the roll against an ironing shoe.

27. In an ironing machine, a fixed supporting element, a rotatable roll, a support for said roll comprising a yoke, said yoke consisting of a central knuckle portion provided with bearings in said element and having arms extending laterally therefrom, parallel roll supporting arms extending from said lateral arms, and an actuating arm for said yoke yieldingly connected to the said knuckle portion.

28. In an ironing machine, a fixed supporting element, a rotatable roll, a support for said roll comprising a yoke, said yoke consisting of a central hollow knuckle portion provided with bearings in said element and having hollow arms extending laterally therefrom, parallel roll supporting arms extending from said lateral arms, an actuating arm for said yoke connected to the said knuckle portion and yielding means in said connection.

29. In an ironing machine, a fixed supporting element, a rotatable roll, a support for said roll comprising a yoke, said yoke consisting of a central hollow knuckle portion provided with bearings in said element and having hollow arms extending laterally therefrom, parallel roll supporting arms extending from said lateral arms, and an actuating arm for said yoke connected to said knuckle through spring tensioning means, there being a stop to limit the relative movement between said knuckle portion and said actuating arm.

30. In an ironing machine, a rotatable roll, a support for said roll comprising a yoke, said yoke comprising a central hollow knuckle having its mid portion open at one side and its end portions forming bearing portions, tubes fixed in said bearing portions having their inner ends extending into the open mid portion of the knuckle, and an actuating arm for said yoke loosely mounted upon the inner ends of said tubes but having a yielding means enclosed in one of said hollow arms, said mid portion of the knuckle housing the end of said actuating arm.

31. In an ironing machine, a rotatable roll, a support for said roll comprising a yoke, said yoke comprising a central hollow knuckle; having its mid portion open at one side and its end portions forming bearing portions, tubes fixed in said bearing portions having their inner ends extending into the open mid portion of the knuckle, an actuating arm for said yoke loosely mounted upon the inner ends of said tubes, a spring anchor block loosely mounted in the inner end of one tube and fixed to said actuating arm, and a spring fixed at one end to said block and at its other end to the last mentioned tube.

32. In an ironing machine, a rotatable roll, a support for said roll comprising a yoke, said yoke comprising a central hollow knuckle having its mid portion open at one side and its end portions forming bearing portions, tubes fixed in said bearing portions having their inner ends extending into the open mid portion of the knuckle, an actuating arm for said yoke loosely mounted upon the inner ends of said tubes, and a torsion spring fixed at one end to said arm and at its other end to the yoke.

33. In an ironing machine, a rotatable roll, a support for said roll comprising a yoke, said yoke comprising a central hollow knuckle having its mid portion open at one side and its end portions forming bearing portions, tubes fixed in said bearing portions having their inner ends extending into the open mid portion of the knuckle, an actuating arm for said yoke loosely mounted upon the inner ends of said tubes, a spring anchor block loosely mounted in the inner end of one tube and fixed to said actuating arm, and a torsion spring fixed at one end to said block and at its other end to the outer end of the last mentioned tube.

34. In an ironing machine, a rotatable roll, a support for said roll comprising a yoke, said yoke comprising a central hollow knuckle having its mid portion open at one side and its end portions forming bearing portions, tubes fixed in said bearing portions having their inner ends extending into the open mid portion of the knuckle, an actuating arm for said yoke loosely mounted upon the inner ends of said tubes, a spring anchor block loosely mounted in the inner end of one tube and fixed to said actuating arm, and a torsion spring fixed at one end to said block and adjustably fixed at its other end to the outer end of the last mentioned tube.

35. In an ironing machine, a rotatable roll, a support for said roll comprising a yoke, said yoke comprising a central hollow knuckle having its mid portion open at one side and its end portions forming bearing portions, tubes fixed in said bearing portions having their inner ends extending into the open mid portion of the knuckle, and an actuating arm for said yoke loosely mounted upon the inner ends of said tubes and shoulders upon said actuating arm co-acting with the edges of said mid portion to limit the relative movement therebetween.

36. In an ironing machine, a rotatable roll, a support for said roll comprising a yoke, said yoke comprising a central hollow knuckle having its mid portion open at one side and its end portions forming bearing portions, tubes fixed in said bearing portions having their inner ends extending into the open mid portion of the knuckle, means to oscillate said yoke, and a drive shaft concentric with said knuckle and one of said tubes for rotating the roll, said shaft extending from within said knuckle to the outer end of the yoke and being connected in driving relation to the end of the roll.

37. In an ironing machine, a rotatable roll, a support for said roll comprising a yoke, said yoke comprising a central hollow knuckle having laterally extending hollow arms in one of which is housed a drive shaft connected at its outer end in driving relation to the roll and extending into said knuckle, a sprocket on the knuckle end of the shaft, means for raising and lowering said yoke and thereby said roll, a drive chain to said sprocket from a drive sprocket, and means to drive the latter, said latter means including a clutch operable by said raising and lowering means to drive the second sprocket when said yoke is lowered and to free it when said yoke is raised.

38. In an ironing machine having an ironing shoe, and a rotatable roll movable toward and away from said shoe, means for rotating said roll consisting of a driving shaft, a clutch member fixed thereto, a second clutch member in rotating relation to the roll, means for engaging the clutch members and means for holding said members disengaged only when said roll is away from said shoe, and other means for holding said members disengaged when the roll is moved toward said shoe.

39. An ironing machine comprising an ironing shoe with means for heating same, a roll co-operating with said shoe, said roll being rotatable and movable toward and from said shoe, means for rotating and moving said roll, said latter means consisting of a motor having a shaft extending therefrom, a gear fixed on said shaft and including a clutch member, a sleeve upon the shaft carrying another clutch member and driving sprocket fixed thereto, a second shaft having a sleeve thereon, the latter sleeve being provided with a gear meshing with the first gear and also provided with a clutch member, said second shaft having a co-operating clutch member fixed thereto, means connected to said second shaft for moving said roll, and means connected to said moving means for operating the first mentioned clutch whereby when the second clutch is engaged the roll will be moved and the first clutch be operated to engage or disengage the roll driving sprocket.

40. In an ironing machine, an ironing shoe and a rotatable roll and means for moving one relative to the other, said means including an actuating arm connected to the movable member and having a pitman connection with a shaft, a clutch member secured to said shaft, a co-operating clutch member, means for driving the latter, and means for causing engagement of said clutch during a part only of a revolution thereof.

41. In an ironing machine having an ironing shoe and a roll, means for moving one relative to the other, including an arm, a crank, and a pitman, said pitman consisting of a link pivoted at one end on said crank and a second link pivoted to said arm and to the other end of the first link and normally positioned above the latter with its arm pivot below a straight line through the ends of the first link, and means for disturbing the normal relation and approximately aligning said links.

42. In an ironing machine having an ironing shoe and a roll, means for moving one relative to the other, including an arm, a crank, and a pitman, said pitman consisting of a plurality of links normally arranged so that the pitman is of less length than the sum of the lengths of the links, and means for disturbing this relation and arranging the links so that the pitman length exceeds its normal length.

43. In an ironing machine in front of which an operator is to be seated, a horizontal padded roll, a heated metallic smooth faced shoe in front of and below the roll, means to rotate the roll so that points thereon travel downwardly as they approach the shoe, the shoe being supported intermediate its ends so that its ends are free of obstructions.

HERMAN A. SPERLICH.
JOHANNES H. UHLIG.